United States Patent
Chien et al.

(10) Patent No.: US 8,189,955 B2
(45) Date of Patent: May 29, 2012

(54) NOISE SUPPRESSION METHOD USING MULTIPLE DIGITAL

(75) Inventors: Chung-Fang Chien, Taipei (TW); Che-Hung Lin, Nantou County (TW)

(73) Assignee: Altek Corporation, Hsinchu (TW)

( * ) Notice: Subject to any disclaimer, the term of this patent is extended or adjusted under 35 U.S.C. 154(b) by 400 days.

(21) Appl. No.: 12/649,041

(22) Filed: Dec. 29, 2009

(65) Prior Publication Data

US 2011/0081086 A1    Apr. 7, 2011

(30) Foreign Application Priority Data

Oct. 7, 2009  (TW) .............................. 98134041 A

(51) Int. Cl.
*G06K 9/40* (2006.01)

(52) U.S. Cl. ...................................... 382/275; 382/282

(58) Field of Classification Search .................. 382/260, 382/275, 282

See application file for complete search history.

(56) References Cited

U.S. PATENT DOCUMENTS 5,845,017 A * 12/1998 Keyes ............................ 382/261
6,907,144 B1 * 6/2005 Gindele ......................... 382/275

* cited by examiner

*Primary Examiner* — Phuoc Tran
(74) *Attorney, Agent, or Firm* — Morris Manning & Martin LLP; Tim Tingkang Xia, Esq.

(57) ABSTRACT

A noise suppression method using multiple digital images performs a de-noising process with the multiple digital images. First, a feature weighting procedure and an image feature compensation of a target pixel are performed on each digital image, and then a cross reference is performed on the multiple continuous or similar digital images to suppress noises for the target pixel.

6 Claims, 8 Drawing Sheets

NOISE SUPPRESSION METHOD USING MULTIPLE DIGITAL

CROSS-REFERENCE TO RELATED APPLICATIONS

This non-provisional application claims priority under 35 U.S.C. §119(a) on Patent Application No(s). 098134041 filed in Taiwan, R.O.C. on Oct. 7, 2009, the entire contents of which are hereby incorporated by reference.

BACKGROUND

1. Field of Invention

The present invention relates to a digital image processing method, and more particularly to a noise suppression method using multiple digital images.

2. Related Art

With the rapid development of digital cameras, the demands for digital images are greatly increased. The digital camera uses a planar photosensitive element to capture an entire image or a square area from an image. Once an exposure is completed, a control circuit transfers charges on a capacitor unit to a next adjacent unit. When reaching the last unit on the edge, the charge signal is transmitted to an amplifier and converted into an electric potential. The above process is repeated until the entire image is converted into electric potentials. The electric potentials are sampled and digitized and then stored in a memory.

However, after a long-time exposure, surface charge fluctuation occurs to the photosensitive element. Due to the charge fluctuation, some noises are produced in the imaging of the digital image. In addition to the exposure time, the increase of the gain of the photosensitive element may also improve the photoreceptive capability of the photosensitive element but result in the charge fluctuation more easily.

Besides the hardware processing, software processing also causes noises. For example, when an edge sharpening process is performed on the digital image, for pixels of different colors that are originally less visible in the digital image, color gradations of the different colors are raised due to the sharpening process, so that particles of different colors appear in the digital image.

Therefore, a lot of camera manufacturers or image processing manufacturers suggest many noise elimination methods in order to improve the quality of the digital image. Most of the noise elimination methods work with digital filtering techniques. For example, the noise elimination may be implemented by a similar color correction or blurring process. Although these methods can reduce the noises in the digital image, the overall imaging quality of the digital image is affected. For example, for the digital image processed by blurring, the difference between pixels of similar colors may be further reduced, but accordingly, the original boundary in the digital image is blurred and cannot be easily recognized.

SUMMARY

In view of the above, the present invention is mainly a noise suppression method using multiple digital images, for performing a color correction process on a pixel with pixels in adjacent areas in the multiple digital images.

In order to achieve the above objective, the present invention provides a noise suppression method using multiple digital images. The method comprises: acquiring the multiple digital images; performing a first pixel compensation procedure on each of the digital images; and performing a second pixel compensation procedure on a comparison image among the digital images.

The first pixel compensation procedure comprises: converting each original pixel in the digital image into a feature weighted pixel by using a feature weighting procedure, so as to output a feature weighted image; selecting the feature weighted pixel at a corresponding position in the feature weighted image as a datum pixel according to a position of a target pixel in the digital image; performing a similarity degree computation procedure to compute a similarity degree of the datum pixel to each of the feature weighted pixels other than the datum pixel; selecting a feature weighted pixel from the feature weighted pixels other than the datum pixel as a feature weighted pixel for compensation according to the computed similarity degrees; and performing a pixel compensation procedure to compensate an image feature of the target pixel based on the corresponding similarity degree weight value according to an original image value of the selected feature weighted pixel for compensation.

The second pixel compensation procedure comprises: computing a similarity degree of the comparison image to each of the digital images other than the comparison image; and performing a weighted averaging on the feature compensated pixel corresponding to the target pixel according to the similarity degrees of the comparison image to the other digital images, so as to obtain a second feature compensated pixel of the target pixel of the comparison image.

The weighted averaging is implemented according to Equation 6:

$$PixelWeightValue'(i) = \frac{\sum_{k=1:N} \omega_k \times PixelWeightValue_k(i)}{\sum_{k=1:N} \omega_k} \quad \text{Equation 6}$$

where i represents the target pixel, k represents any one of the digital images other than the comparison image, PixelWeightValue'(i) is a pixel value of the second feature compensated pixel of the target pixel in the comparison image, $PixelWeightValue_k(i)$ is a pixel value corresponding to a first feature compensated pixel of the target pixel in the digital image other than the comparison image, $\omega_k$ is the similarity degree of the comparison image to the digital image other than the comparison image, N represents a number of the digital images, i is any positive integer in 1 to N, and k is any positive integer in 1 to N other than k.

The first pixel compensation procedure is implemented according to Equations 1, 2, 3, and 4:

$$Diff(i, j) = \left\| \begin{array}{l} PixelValue(Neighbor_i) - \\ PixelValue(Neighbor_j) \end{array} \right\| \quad \text{Equation 1}$$

$$w(i, j) = f(Diff(i, j)) \quad \text{Equation 2}$$

$$PixelWeightValue(i) = \sum_{j \in R} w(i, j) \times PixelValue(j) \quad \text{Equation 3}$$

$$\sum_{j \in R} w(i, j) = 1 \quad \text{Equation 4}$$

where i represents the target pixel, j represents the original pixel corresponding to the feature weighted pixel around the datum pixel, Diff(i,j) is a difference degree of the datum pixel from the other feature weighted pixel, PixelValue(Neighbor$_i$) is a pixel feature weighted value of the i, PixelValue(Neighbor$_j$) is a pixel feature weighted value of the j, w(i,j) is the similarity degree of the datum pixel to the other feature weighted pixel, f( ) is a conversion function of the difference degree to the similarity degree, PixelWeightValue(i) is a pixel value of the i after a feature compensation procedure is performed thereon, PixelValue(j) is a pixel value of the j, R represents a size of the digital image and is M×N, M and N are positive integers greater than or equal to 1, i is any positive integer in 1 to M×N, and j is any positive integer in 1 to M×N other than i.

In the digital image noise suppression method of the present invention, compensation is performed with pixels having similar image features and high similarity degrees, so that the digital image may not be destroyed and a better image quality is obtained.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

A noise suppression method using multiple digital images according to the present invention is applicable to an electronic computing device for performing a noise color correction process on a digital image input to the electronic computing device through the electronic computing device. In other words, the noise suppression method using multiple digital images according to the present invention may be stored in the form of a software or firmware program in a storage unit (for example, a memory or a hard disk) of the electronic computing device and implemented through the execution of the stored software or firmware program by a processor of the electronic computing device.

Figure 1:
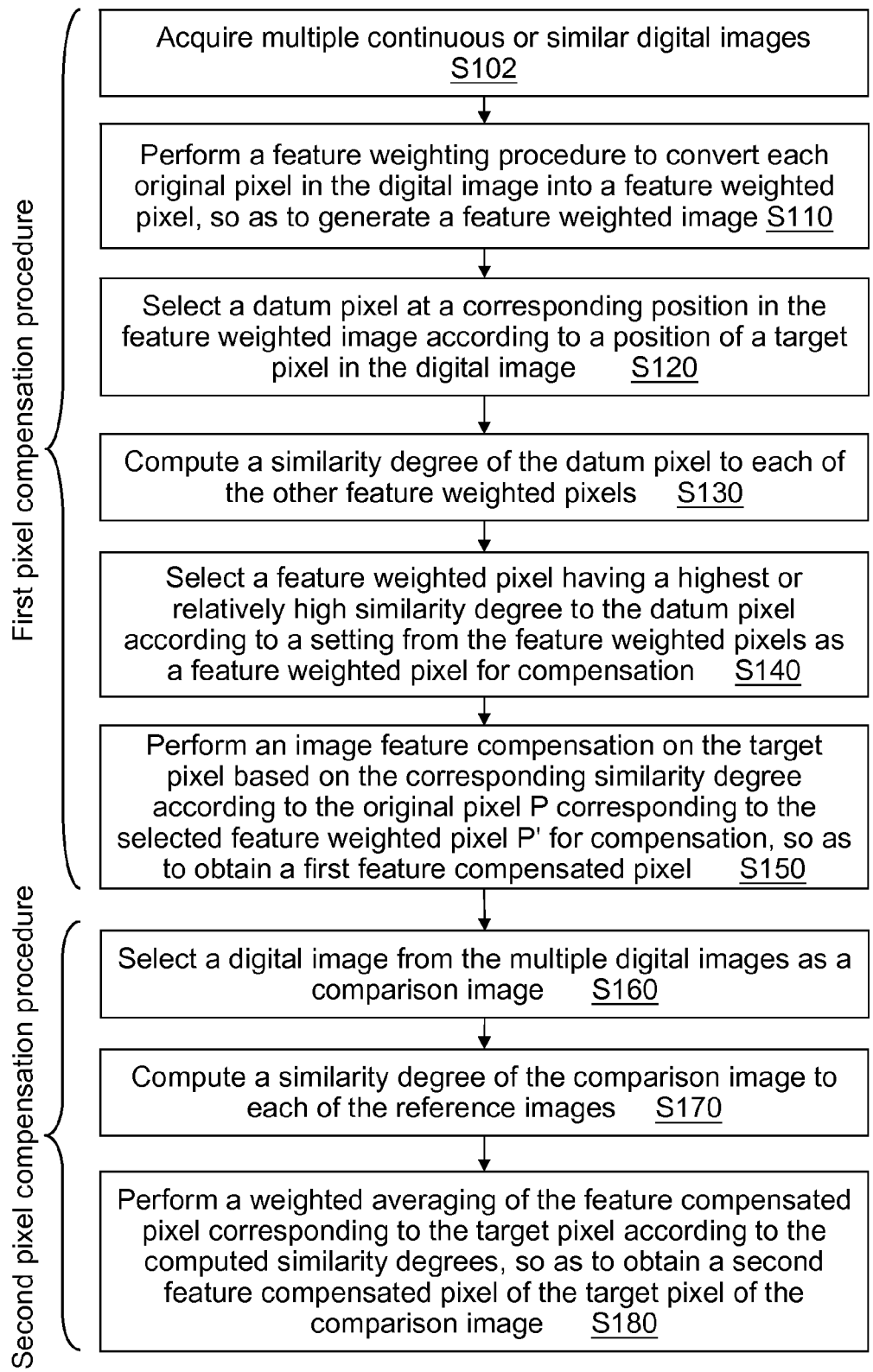
FIG. 1 is a flow chart of a noise suppression method using multiple digital images according to an embodiment of the present invention.

FIG. 1 is a flow chart of an operating process according to an embodiment of the present invention. The digital image noise suppression method using multiple images comprises the following steps.

First, in Step S102, multiple continuous or similar digital images are acquired.

Moreover, pixel compensation is performed on each of the digital images, i.e., a first pixel compensation procedure is performed.

Figure 2A:
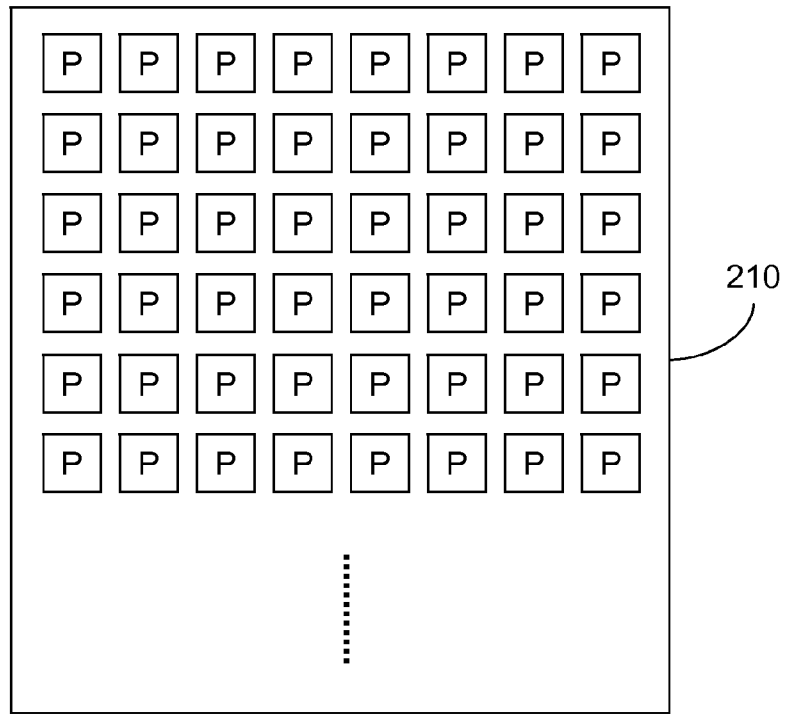
FIG. 2A is a schematic view of a digital image in an embodiment.
Figure 2B:
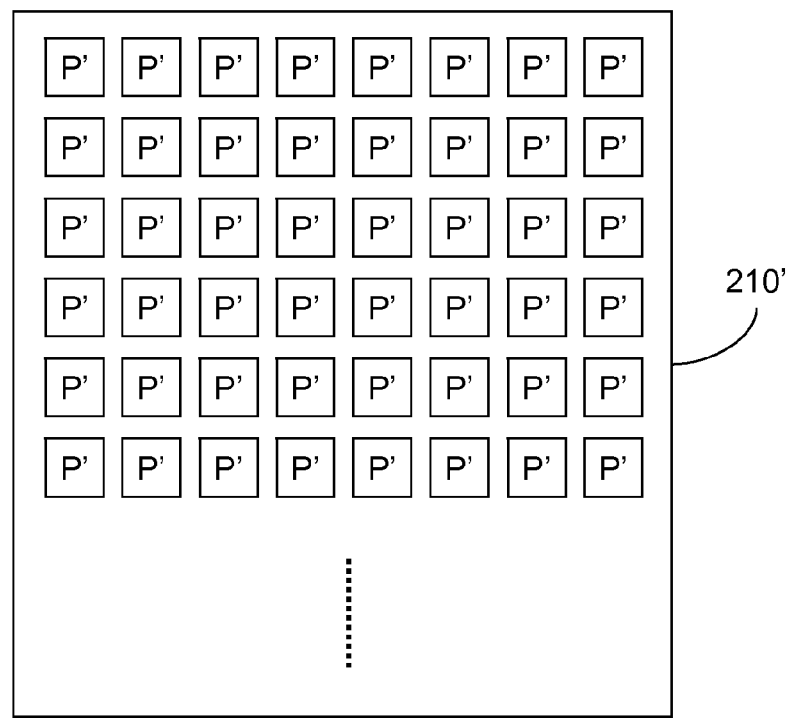
FIG. 2B is a schematic view of a feature weighted image in an embodiment.

In Step S110, each original pixel P in the digital image 210 is converted into a feature weighted pixel P' by using a feature weighting procedure, so as to generate a feature weighted image 210', as shown in FIGS. 2A and 2B.

In Step S120, a feature weighted pixel is selected at a corresponding position in the feature weighted image 210' as a datum pixel according to a position of a target pixel in the digital image 210. The target pixel is one of all the original pixels P in the digital image 210.

In Step S130, a similarity degree of the datum pixel to each of the feature weighted pixels P' other than the datum pixel is computed.

In Step S140, a feature weighted pixel P' having a highest or relatively high similarity degree to the datum pixel is selected according to a setting from the feature weighted pixels P' as a feature weighted pixel for compensation. In addition, a feature weighted pixel having a similarity degree to the datum pixel greater than a threshold or satisfying a preset condition may also be selected as the feature weighted pixel for compensation. In other words, this step may be set to selecting a feature weighted pixel P' having a highest similarity degree to the datum pixel, selecting a feature weighted pixel P' having a relatively high similarity degree to the datum pixel, selecting a feature weighted pixel P' having a similarity degree to the datum pixel greater than a threshold, or selecting a feature weighted pixel P' having a similarity degree to the datum pixel satisfying a preset condition as a feature weighted pixel for compensation in advance according to actual requirements.

In Step S150, an image feature compensation is performed on the target pixel based on the corresponding similarity degree according to the original pixel P corresponding to the selected feature weighted pixel P' for compensation, so as to obtain a first feature compensated pixel.

Afterwards, a pixel compensation is performed between the digital images, i.e., a second pixel compensation procedure is performed.

In Step S160, a digital image 210 is selected from the multiple digital images 210 as a comparison image. The digital images 210 other than the comparison image serve as reference images.

In Step S170, a similarity degree of the comparison image to each of the reference images is computed.

In Step S180, a weighted averaging of the feature compensated pixel corresponding to the target pixel is performed according to the computed similarity degrees, so as to obtain a second feature compensated pixel of the target pixel of the comparison image.

Figure 3:
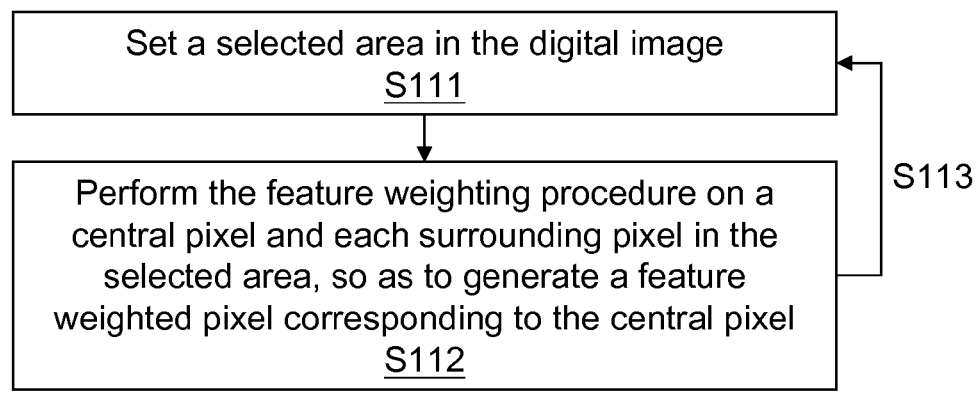
FIG. 3 is a flow chart of a feature weighting procedure in an embodiment.
Figure 4:
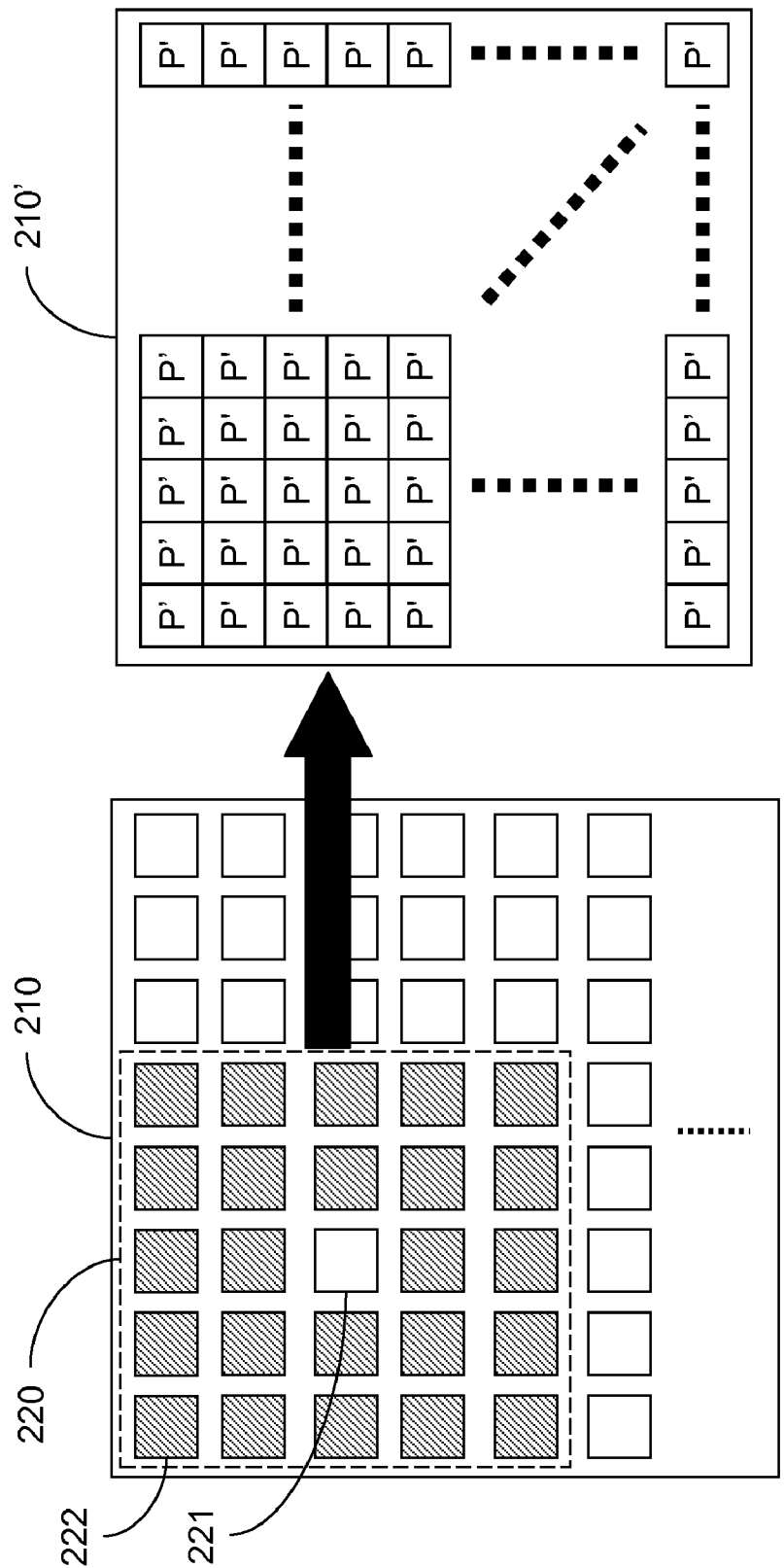
FIG. 4 is a schematic view illustrating conversion of the digital image into the feature weighted image in an embodiment.

Referring to FIGS. 3 and 4, the feature weighting procedure in Step S110 may further comprise the following substeps.

In Step S111, a selected area 220 is set in the digital image 210. The selected area 220 refers to a partial image block in the digital image 210, and may have a particular size or may be a single pixel. Herein, the selected area 220 may be an a×b pixel array, and a and b are positive integers greater than or equal to 1, in which a and b may be the same numerical value or different numerical values.

In Step S112, the feature weighting procedure is performed on a central pixel 221 and each surrounding pixel 222 in the selected area 220, so as to generate a feature weighted pixel 221' of the central pixel 221. The central pixel 221 is an original pixel P at the center of the selected area 220, and the surrounding pixels 222 are original pixels P around the central pixel 221 in the selected area 220.

In Step S113, Steps S111 and S112 are performed repeatedly until each of the original pixels P in the digital image 210 is converted into a feature weighted pixel P'.

Figure 5A:
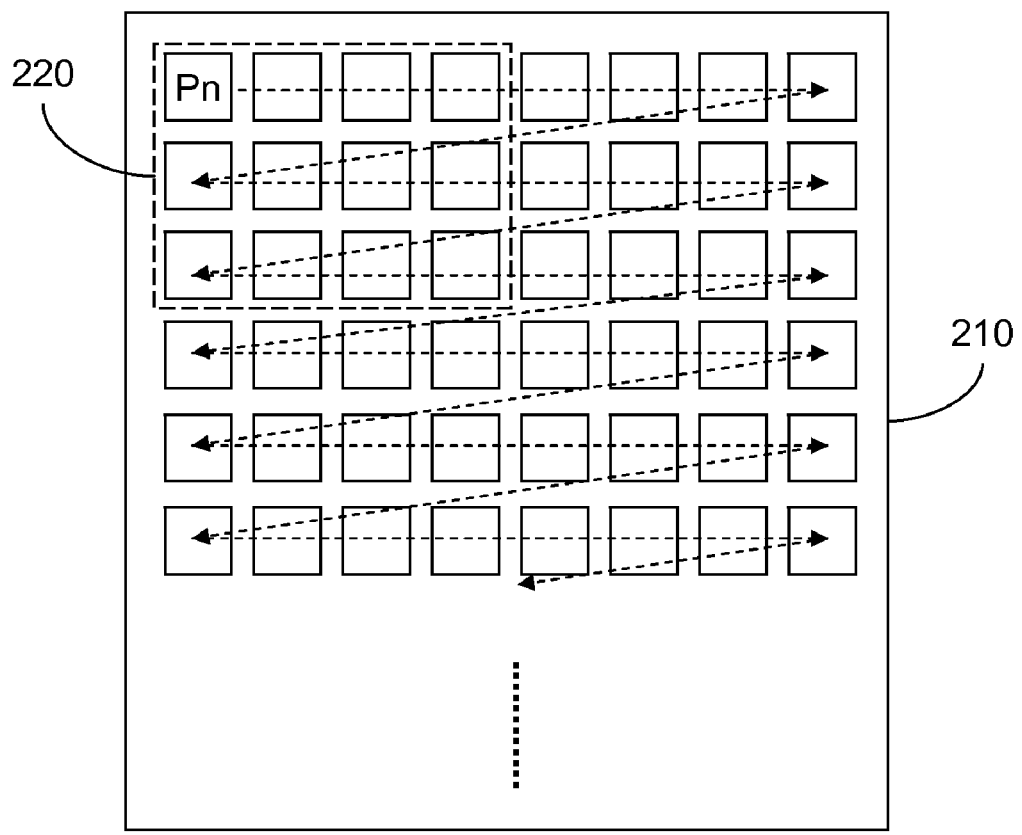
FIG. 5A is a schematic view of a selection direction of a selected area in a first embodiment.
Figure 5B:
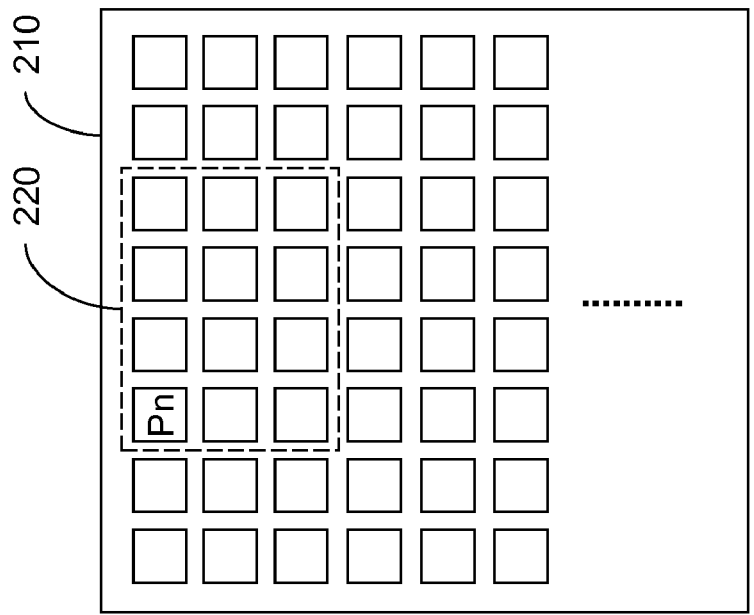
FIG. 5B is a schematic view of a selection direction of the selected area in a second embodiment.
Figure 5B:
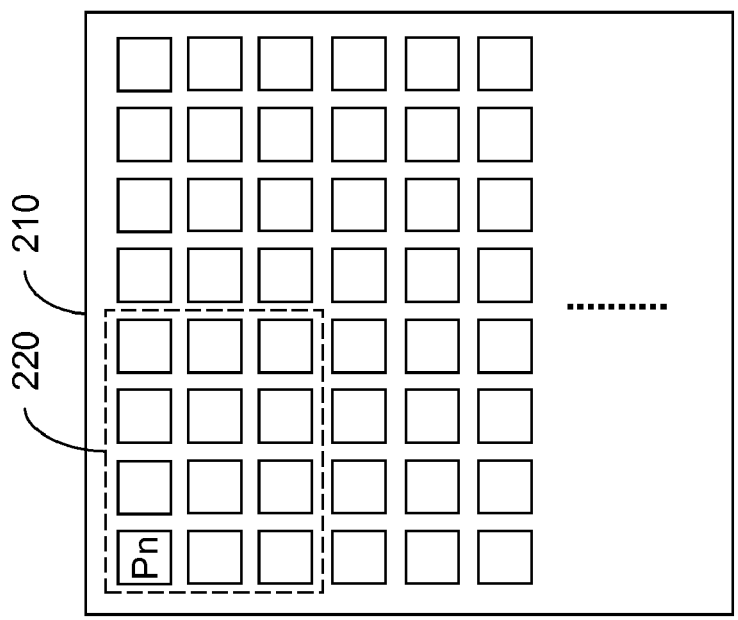
Figure 5C:
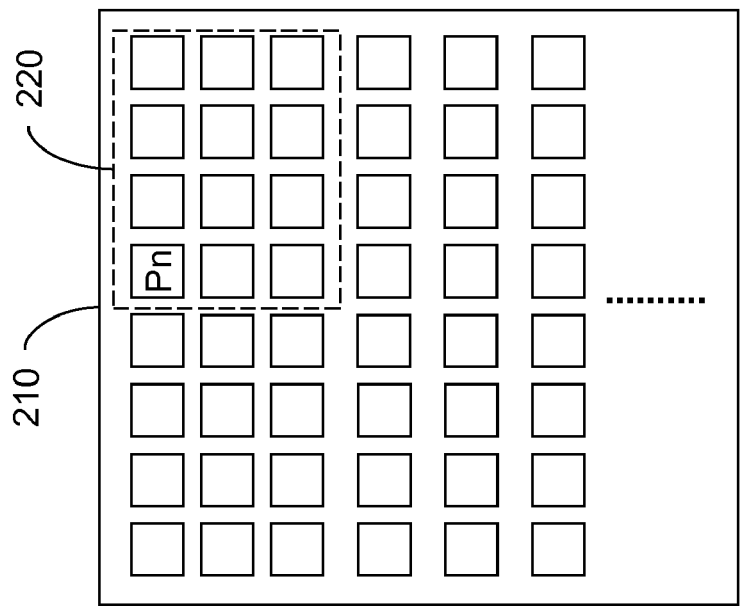
FIG. 5C is a schematic view of a selection direction of the selected area in a third embodiment.
Figure 5C:
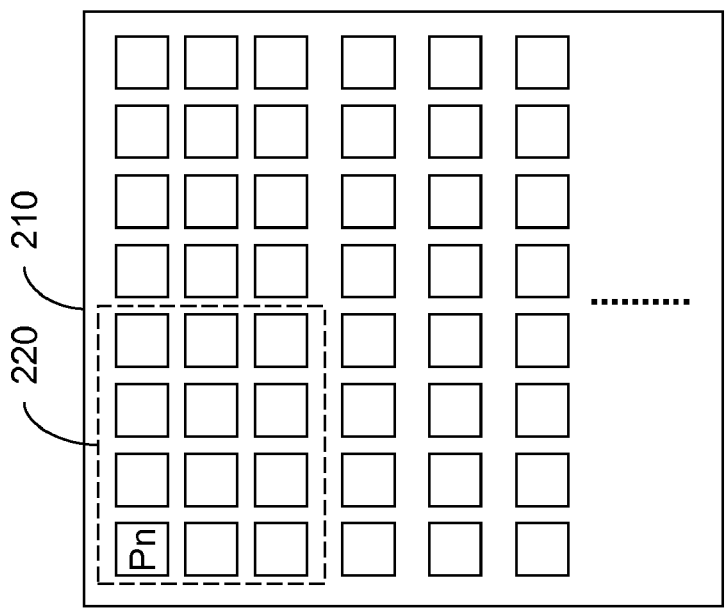

Referring to FIGS. 5A, 5B, and 5C, a selection sequence of the selected area 220 depends on a selected positioning pixel Pn. In other words, each time the selected area 220 is set, a pixel is selected as the positioning pixel, and then the selected area 220 is formed based on the positioning pixel Pn. An original pixel at any position (for example, the upper right corner, upper left corner, lower right corner, lower left corner, or center) of the selected area 220 may be set as the positioning pixel Pn.

In this embodiment, the selected area 220 may be set by selecting the positioning pixel Pn sequentially in a Z-shape (for example, in the direction denoted by dashed lines in FIG. 5A), i.e., in the directions from left to right and from top to bottom. Thus, the selected area 220 may be sequentially set in an overlapping manner, so that the selection covers every image block in the entire digital image, as shown in FIG. 5B. Certainly, the positioning pixel Pn and the selected area 220 may also be selected in different directions and sequences. In addition, the selected area 220 may also be set in a non-overlapping manner, as shown in FIG. 5C.

Due to the use of the selected area 220, the edge of the digital image 210 cannot generate the corresponding feature weighted pixels P', so that the size of the feature weighted image 210' after weighting is slightly smaller than that of the digital image 210. For example, if the digital image 210 is a 100*100 (pixel array) image and the selected area 220 is a 3*3 pixel array, the output feature weighted image 210' is a 98*98 pixel array.

Therefore, the edge of the digital image 210 is employed to compensate the edge of the feature weighted image 210', and the size of the feature weighted image 210' becomes the same as that of the digital image 210.

Alternatively, a corresponding relation between the feature weighted image 210' and the digital image 210 is adjusted instead of compensating the edge of the feature weighted image 210'. For example, a feature weighted pixel at the position (1,1) on the feature weighted image 210' is corresponding to an original pixel at the position (3,3) on the digital image 210. Similarly, for other digital images 210 and selected areas 220 of different sizes, corresponding relations of pixels between the feature weighted image 210' and the digital image 210 may also be established in the above manner.

FIG. 4 is a schematic view of the feature weighted pixels P' corresponding to the original pixels P in the selected area 220. For ease of illustration, the positioning pixel selected in the digital image 210 is defined herein as the central pixel 221. After the central pixel 221 is selected, an a×b pixel array is set centering around the central pixel 221. Herein, the a×b pixel array is defined as the selected area 220. The central pixel 221 performs the feature weighting procedure on the other original pixels (i.e., the surrounding pixels 222, for example, the original pixels filled with slanting lines in FIG. 4) in the selected area 220 respectively, so as to obtain the feature weighted pixel 221' corresponding to the central pixel 221.

For example, if the selected area 220 is a 5*5 pixel array, an original pixel at the pixel position (3,3) may be selected as the central pixel 221. The position of the central pixel 221 may be selected according to different implementation aspects, and will not be listed herein one by one.

Next, referring to the following Equations 1 to 4, similarity degrees and the first feature compensated pixel are computed with the values of the pixels.

$$Diff(i, j) = \left\| \begin{matrix} PixelValue(Neighbor_i) - \\ PixelValue(Neighbor_j) \end{matrix} \right\| \quad \text{Equation 1}$$

$$w(i, j) = f(Diff(i, j)) \quad \text{Equation 2}$$

$$PixelWeightValue(i) = \sum_{j \in R} w(i, j) \times PixelValue(j) \quad \text{Equation 3}$$

$$\sum_{j \in R} w(i, j) = 1 \quad \text{Equation 4}$$

where i represents the target pixel (i.e., the $i^{th}$ original pixel), and j represents the datum pixel (i.e., the $j^{th}$ original pixel). The datum pixel refers to an original pixel corresponding to a referable feature weighted pixel around the datum pixel. For example, if the digital image 210 is an M×N pixel array and M and N are positive integers greater than or equal to 1, i is any positive integer in 1 to M×N, and j is any positive integer in 1 to M×N other than i.

PixelValue(Neighbor$_i$) is a pixel feature weighted value of the target pixel i, i.e., the datum pixel.

Pixel Value(Neighbor$_j$) is a pixel feature weighted value of the datum pixel j in the selected area 210 where the target pixel i is located, i.e., the feature weighted pixel other than the datum pixel.

f(.) is a conversion function of the difference degree to the similarity degree weight value of the feature weighted pixel.

Diff(i,j) is a difference degree of the feature weighted values of the target pixel i from the datum pixel j, i.e., a difference degree of the datum pixel from the other feature weighted pixel.

PixelWeightValue(i) is a corrected pixel value of the target pixel i, i.e., a pixel value of the target pixel i after an image feature compensation is performed thereon (the first feature compensated pixel).

PixelValue(j) is an original pixel value of the datum pixel j before processing.

w(i,j) is a similarity degree weight value of the target pixel i to the datum pixel j, i.e., a similarity degree of the datum pixel to the feature weighted pixel other than the datum pixel.

R represents a size of the digital image.

The noise suppression method using multiple digital images according to the present invention may compute the similarity degrees not only for the colors of the pixels (a pixel feature) but also for different image feature values. For example, the image features may be, but not limited to, a color space, an image material, an image texture, and/or an image brightness value. In terms of the color space, the similarity degree weight value w(i,j) may be changed to the following Equation 5.

$$Diff(i,j) = \|ColorIndexValue(Neighbor_i) - ColorIndexValue(Neighbor_j)\| \quad \text{Equation 5}$$

ColorIndexValue(Neighbor$_i$) is a feature weighted value of a color space of the target pixel i, i.e., the datum pixel.

PixelValue(Neighbor$_j$) is a feature weighted value of a color space of the datum pixel j in the selected area 210 where the target pixel i is located.

Then, the similarity degrees between the adjacent pixels are further computed according to relations between the image features (or combinations thereof). The relation between the human vision and different image features is not merely a linear relation obtained by simply adding up the pixels. For example, in the selected area 220 having a complex texture, the similarity degrees between the pixels are reduced due to the texture.

After the feature weighted pixels of all the pixels in the digital image 210 are completed, a feature weighted image is generated according to a generation sequence of the feature weighted pixels. Next, the feature weighted pixels are selected one by one from the feature weighted image to perform the similarity degree computation. Herein, the selected feature weighted pixel is defined as the datum pixel (i.e., a feature weighted pixel at a corresponding position of the target pixel). A similarity degree of the image features of the target pixel to the datum pixel is acquired to obtain the similarity degree weight value w(i,j). A feature weighted pixel having a highest or relatively high similarity degree to the datum pixel is selected from the feature weighted pixels 221' and is defined as a feature weighted pixel for compensation. A feature compensation procedure is performed on the target pixel according to the original pixel at the position of the feature weighted pixel for compensation and a new compensated target pixel is output.

The feature compensation procedure for compensating an image feature may be, but not limited to, a substitution or averaging of the pixel values or the like. Taking the averaging as an example, a value of the target pixel and a value obtained after the weight value computation are averaged to output a new corrected target pixel. Meanwhile, the similarity degree weight value is computed according to the selected highest similarity degree, relatively high similarity degree under a certain condition, or pixel similarity degrees in all the selected areas depending on actual requirements and applications.

In this implementation aspect, similarity degrees between all the pixels in the digital image are computed respectively. In order to illustrate an operating process of the present invention clearly, a facial image is adopted herein in this embodiment.

Figure 6A:
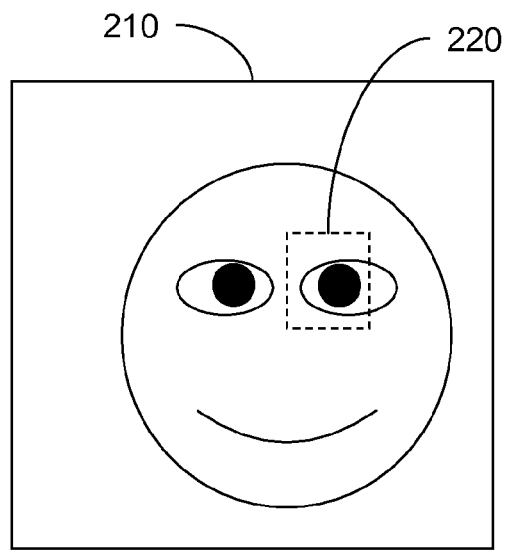
FIG. 6A is a schematic view of a digital image in another embodiment.
Figure 6B:
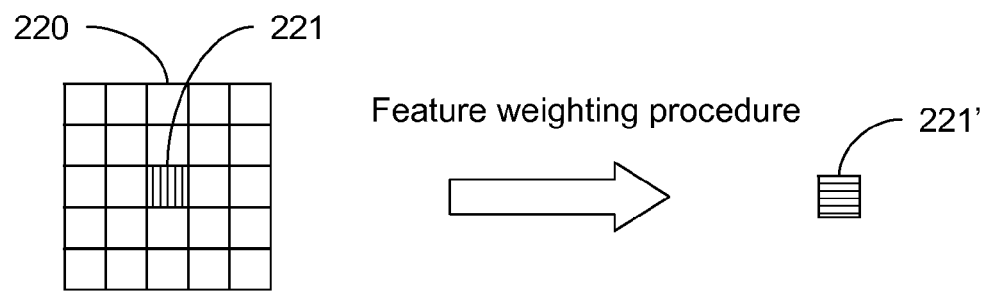
FIG. 6B is a schematic view of a feature weighting procedure corresponding to FIG. 6A.

Firstly, an original pixel is selected and a corresponding selected area 220 is set in a digital image 210, as shown in FIG. 6A. It is assumed that the selected area 220 is a 5*5 pixel array in size and a central pixel 221 is a pixel at the position (3,3) in the selected area 220. Then, pixels in the selected area 220 are used to perform a feature weighting procedure on the central pixel 221 to generate a corresponding feature weighted pixel 221', as shown in FIG. 6B. In other words, the selected area 220 is used to generate a feature weighted value of the central pixel 221. The above operation is repeated for the digital image so as to generate a feature weighted pixel of each original pixel in the digital image 210.

Figure 6C:
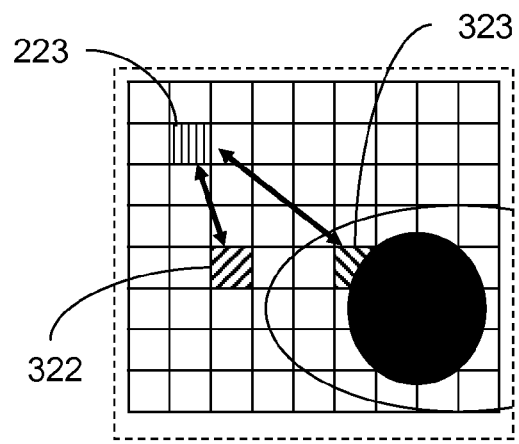
FIG. 6C is a schematic view of a similarity degree computation procedure corresponding to FIG. 6A.

FIG. 6C is a partial image of a feature weighted image 210'. In FIG. 6C, a feature weighted pixel is selected and defined as a datum pixel 223. Moreover, a comparison range is set, and a similarity degree of the datum pixel 223 to each of the other feature weighted pixels in the comparison range is computed. The comparison range may be set as large as the selected area 220 or have different limitations. For example, in a small digital image 210, the comparison range may be set to the entire digital image 210; while in a large digital image 210, the comparison range may be set to a pixel array of a large range so as to accelerate the computation thereof.

In this embodiment, similarity degrees of the datum pixel 223 to a second feature weighted pixel 322 and a third feature weighted pixel 323 are computed respectively. In other implementation aspects, the comparison of similarity degrees may be performed by selecting an appropriate number of feature weighted pixels according to different settings.

In terms of a color difference, it can be seen from the feature weighted image 210' in FIG. 6C that, the difference between the datum pixel 223 and the second feature weighted pixel 322 is smaller than that between the datum pixel 223 and the third feature weighted pixel 323. In other words, the second feature weighted pixel 322 is closer to the datum pixel 223 than the third feature weighted pixel 323. Therefore, if the datum pixel 223 is a noise pixel, the second feature weighted pixel 322 is preferentially selected for compensation.

Referring to the following Equation 6, a weighted averaging degree for the pixel value of the first feature compensated pixel is computed.

$$PixelWeightValue'(i) = \frac{\sum_{k=1:N} \omega_k \times PixelWeightValue_k(i)}{\sum_{k=1:N} \omega_k} \quad \text{Equation 6}$$

PixelWeightValue'(i) is a corrected pixel value of the target pixel i in the comparison image after final processing, i.e., a pixel value of the second feature compensated pixel of the target pixel i in the comparison image.

PixelWeightValue$_k$(i) is a pixel value corresponding to the first feature compensated pixel of the target pixel i in the reference image k.

$\omega_k$ is a similarity degree of the reference image k to the comparison image.

N is a total number of the digital images, and N is a positive integer above 2.

In the present invention, a digital image 210 is divided into a plurality of selected areas 220, and a feature weighted pixel P' representing the corresponding selected area 220 is generated in each of the selected areas 220. A pixel that has been weighted is selected as a datum pixel 223, and a similarity degree of the datum pixel 223 to each of the other feature weighted pixels is computed. Then, a compensation correction weight for each feature weighted pixel P' to correct the datum pixel 223 is computed. Finally, the value of a target pixel is corrected by using the values of original pixels where the feature weighted pixels P' are located. Afterward, a cross reference is performed between multiple continuous or similar digital images to achieve a better image quality. Since the present invention compensates the target pixel with similar pixels having high similarity degrees, the original digital image may not be destroyed and a better image quality is obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A noise suppression method using multiple digital images, for performing a de-noising process with the multiple digital images, the method comprising:
   acquiring the multiple digital images;
   performing a first pixel compensation procedure on each of the digital images, the first pixel compensation procedure comprising:
      converting each original pixel in the digital image into a feature weighted pixel to form a feature weighted image;
      selecting one of the feature weighted pixels at a corresponding position in the feature weighted image as a datum pixel according to a position of a target pixel in the digital image, wherein the target pixel is one of all the original pixels in the digital image;

computing a similarity degree of the datum pixel to each of the feature weighted pixels other than the datum pixel;

selecting a feature weighted pixel for compensation from the other feature weighted pixels according to the similarity degrees of the datum pixel to the other feature weighted pixels; and compensating an image feature of the target pixel based on the corresponding similarity degree according to the original pixel the position of which corresponds to the position of the feature weighted pixel for compensation to obtain a first feature compensated pixel of the target pixel; and performing a second pixel compensation procedure on a comparison image from among the digital images, wherein the comparison image is one of the digital images, the second pixel compensation procedure comprising:

computing a similarity degree of the comparison image to each of the digital images other than the comparison image; and performing a weighted averaging on the feature compensated pixel corresponding to the target pixel according to the similarity degrees of the comparison image to the other digital images, to obtain a second feature compensated pixel of the target pixel of the comparison image.

2. The noise suppression method using the multiple digital images according to claim 1, wherein the weighted averaging is implemented according to Equation 6, where i represents the target pixel, k represents any one of the digital images other than the comparison image, PixelWeightValue'(i) is a pixel value of the second feature compensated pixel of the target pixel in the comparison image, PixelWeightValue$_k$(i) is a pixel value corresponding to the first feature compensated pixel of the target pixel in the digital image other than the comparison image, $\omega_k$ is the similarity degree of the comparison image to the digital image other than the comparison image, N represents a number of the digital images, i is any positive integer in 1 to N, and k is any positive integer in 1 to N other than k $$PixelWeightValue'(i) = \frac{\sum_{k=1:\ N} \omega_k \times PixelWeightValue_k(i)}{\sum_{k=1:\ N} \omega_k}. \quad \text{Equation 6}$$

3. The noise suppression method using the multiple digital images according to claim 1, wherein the step of converting each original pixel in the digital image into a feature weighted pixel comprises:

setting a selected area in the digital image;

performing a feature weighting procedure on a central pixel and each surrounding pixel in the selected area, so as to generate the feature weighted pixel corresponding to the central pixel, wherein the central pixel is one of the original pixels at the center of the selected area, and the surrounding pixels are the original pixels around the central pixel in the selected area; and performing the step of setting the selected area and the step of generating the feature weighted pixel corresponding to the central pixel repeatedly until each of the original pixels in the digital image is converted into the feature weighted pixel.

4. The noise suppression method using the multiple digital images according to claim 3, wherein the selected area is an a×b pixel array, and a and b are positive integers greater than or equal to 1.

5. The noise suppression method using the multiple digital images according to claim 1, wherein the first pixel compensation procedure is implemented according to Equations 1, 2, 3, and 4, where i represents the target pixel, j represents the original pixel corresponding to the feature weighted pixel around the datum pixel, Diff(i,j) is a difference degree of the datum pixel from the other feature weighted pixel, PixelValue(Neighbor$_i$) is a pixel feature weighted value of the i, PixelValue(Neighbor$_j$) is a pixel feature weighted value of the j, w(i,j) is the similarity degree of the datum pixel to the other feature weighted pixel, f( ) is a conversion function of the difference degree to the similarity degree, PixelWeightValue(i) is a pixel value of the first feature compensated pixel of the i, PixelValue(j) is a pixel value of the j, R represents a size of the digital image and is M×N, M and N are positive integers greater than or equal to 1, i is any positive integer in 1 to M×N, and j is any positive integer in 1 to M×N other than i $$Diff(i,\ j) = \|PixelValue(Neighbor_i) - PixelValue(Neighbor_j)\| \quad \text{Equation 1}$$

$$w(i,\ j) = f(Diff(i,\ j)) \quad \text{Equation 2}$$

$$PixelWeightValue(i) = \sum_{j \in R} w(i,\ j) \times PixelValue(j) \quad \text{Equation 3}$$

$$\sum_{j \in R} w(i,\ j) = 1. \quad \text{Equation 4}$$

6. The noise suppression method using the multiple digital images according to claim 1, wherein the image feature is a pixel color, a color space, a texture, or a brightness value.

* * * * *